United States Patent
Korolev et al.

(10) Patent No.: US 8,259,924 B2
(45) Date of Patent: Sep. 4, 2012

(54) SYSTEM FOR CREATION AND DYNAMIC MANAGEMENT OF INCOMING INTERACTIONS

(75) Inventors: Nikolay Korolev, Concord, CA (US); Vladimir Mezhibovsky, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 535 days.

(21) Appl. No.: 12/563,341

(22) Filed: Sep. 21, 2009

(65) Prior Publication Data
US 2011/0069821 A1    Mar. 24, 2011

(51) Int. Cl.
*H04M 5/00* (2006.01)
(52) U.S. Cl. .......... 379/265.05; 379/265.13; 379/266.02
(58) Field of Classification Search ... 379/265.01–266.1
See application file for complete search history.

(56) References Cited

U.S. PATENT DOCUMENTS

| | | | | |
|---|---|---|---|---|
| 6,128,380 A | * | 10/2000 | Shaffer et al. | 379/265.01 |
| 6,553,113 B1 | * | 4/2003 | Dhir et al. | 379/265.02 |
| 6,661,882 B1 | * | 12/2003 | Muir et al. | 379/127.01 |
| 6,744,877 B1 | * | 6/2004 | Edwards | 379/265.02 |
| 8,150,020 B1 | * | 4/2012 | Blanchard et al. | 379/265.03 |

* cited by examiner

*Primary Examiner* — Simon Sing
(74) *Attorney, Agent, or Firm* — Donald R. Boys; Central Coast Patent Agency, Inc.

(57) ABSTRACT

A communications center system includes unsolicited inbound transaction traffic for routing to agents, one or more channels engaging visitors to the communication center other than interaction with a live agent, a profiling function for gathering information about the visitors to the communications-center, during the time the visitors are engaged in other than interaction with a live agent, a ranking function for ranking the visitors as to desirability for interaction, according to the information gathered, and an invitation function for sending invitations to transact to the visitors according to the ranking. The system monitors agent availability and the unsolicited inbound transaction traffic, and manages the invitation function to balance total traffic with agent availability.

8 Claims, 9 Drawing Sheets

TP = ProductRevenue*ProbabilityOfSale − (ConstantCost + CostRate*AHT)

US 8,259,924 B2

SYSTEM FOR CREATION AND DYNAMIC MANAGEMENT OF INCOMING INTERACTIONS

BACKGROUND OF THE INVENTION

1. Field of the Invention

The present invention is in the field of telephony communications including data network telephony and pertains particularly to methods and apparatus for balancing agents between agent groups working a blended campaign of stochastic inbound and predictive proactive inbound interaction flows.

2. Discussion of the State of the Art

In the field of telephony communications, communication centers exist for the purpose of sales and servicing customers of small to large enterprises. In today's marketplace, communication centers are typically multi-media capable and handle incoming calls and requests from telephone networks and from the Internet network.

In call-center systems profit margins and agent efficiency rates are very important as is maintenance of service level objectives (SLOs) that are sometimes contractually ordered by the enterprise contracting call center services. In a call center (CC) agents are typically assigned to answer incoming calls and may be organized into groups that are trained in one or more specialized skills to handle a specific set of problems.

It is desired that higher levels of service are provided to more valuable customers in order to improve profitability for the CC. However, incoming interaction flow is usually stochastic in nature, and it is difficult to predict the average level of incoming interactions that would utilize live agents assigned to work interaction queues. Therefore in many cases, service level objectives are still difficult to maintain during peak and valley levels of inbound interaction flow including inbound interactions resulting from outbound calling campaigns. Moreover, it is difficult to schedule call center agents for shorter periods enabling more flexibility in resource building.

In many cases, agent pools are underutilized during periods of low arrival rate of stochastic inbound interaction flow. Offline work can be used to fill the time of idle agents, but if the agents could stay engaged with live interaction for longer periods, the overall profit and efficiency model for the call center would be better served.

Therefore, what is clearly needed is a system for producing traffic proactively, and for dynamically managing the proactive traffic with service traffic to more fully utilize agents in the CC.

SUMMARY OF THE INVENTION

The problem stated above is that optimization of agent resource utilization in a communication center during peak periods of incoming interaction flow is desirable, but many of the conventional means for improving agent resource utilization under such conditions, such as dynamic agent scheduling according to service level requirements, also create situations where agents are underutilized for short to extended periods of time.

The inventors therefore considered functional elements of a communications-center environment, looking for elements that exhibit integrative properties that could potentially be harnessed to provide a higher percentage of agent utilization during peak and wane periods of inbound traffic but in a manner that would not raise costs or degrade service level objectives of the communications center.

Every communications center is driven by interaction load and efficiency of handling the interaction load. Typically, much of the interaction load of a communications center comprises direct inbound interactions, one by-product of which is an inability to precisely control the incoming interaction load. Customers and potential customers (visitors) access the communication center through one or more communication channels. Most such communications-center environments employ routing systems and strategies, statistical gathering and analysis systems, and interaction queue systems to manage and route interactions to appropriate resource pools, also termed agent groups, and are typically a part of such apparatus.

The present inventor realized in an inventive moment that if, at the point of routing, incoming interaction stream intensity could be regulated, and significant optimization in agent utilization might result. The inventor therefore constructed a unique routing system that allowed an incoming interaction stream to be supplemented with fresh interactions proactively, but constrained such supplementation during peak periods of maximum direct inbound traffic. A significant increase in the percentage of agent resource utilization and therefore profit results, with no impediment to function or quality of service created.

Accordingly, in one embodiment of the present invention a communications center system is provided, comprising unsolicited inbound transaction traffic for routing to agents, one or more channels engaging visitors to the communication center other than interaction with a live agent, a profiling function for gathering information about the visitors to the communications-center, during the time the visitors are engaged in other than interaction with a live agent, a ranking function for ranking the visitors as to desirability for interaction, according to the information gathered, and an invitation function for sending invitations to transact to the visitors according to the ranking. The monitors agent availability and the unsolicited inbound transaction traffic, and manages the invitation function to balance total traffic with agent availability.

In one embodiment the information gathered by the profiling function includes determining visitor intent by monitoring behavior and transaction content. Also in one embodiment live agents are managed in specialty agent groups, unsolicited inbound traffic is routed to agent groups according to information known about the customer or the transaction, and invitations to transact are sent to visitors according to manage traffic flow to individual groups as well as total traffic. In some embodiments the visitors to the communication center other than interaction with a live agent are engaged in one of a web site interaction, an IVR transaction, or a chat transaction.

In another aspect of the invention a method for balancing transaction flow in a communications center is provided, comprising steps of (a) monitoring unsolicited inbound transaction traffic for routing to agents; (b) gathering information about visitors engaged with the center other than in interaction with a live agent, during the time the visitors are engaged; (c) ranking the visitors as to desirability for interaction, according to the information gathered; (d) sending invitations to transact to the visitors according to the ranking; and (e) monitoring agent availability and managing the invitation function to balance total traffic with agent availability.

In one embodiment of the method determining visitor intent is accomplished by monitoring behavior and transaction content. Also in one embodiment live agents are managed in specialty agent groups, and the method includes routing unsolicited inbound traffic to agent groups according to information known about the customer or the transaction, and sending invitations to transact to visitors to manage traffic flow to individual groups as well as total traffic. In other embodiments the visitors to the communication center other than interaction with a live agent are engaged in one of a web site interaction, an IVR transaction, or a chat transaction.

BRIEF DESCRIPTION OF THE DRAWING FIGURES

DETAILED DESCRIPTION

The inventors provide a unique system that allows an incoming interaction stream to be supplemented with fresh interactions proactively, but dynamically manages such supplementation with changing levels of direct inbound traffic. The present invention is discussed in enabling detail in the following examples, which singularly or collectively may represent more than one embodiment.

Figure 1:
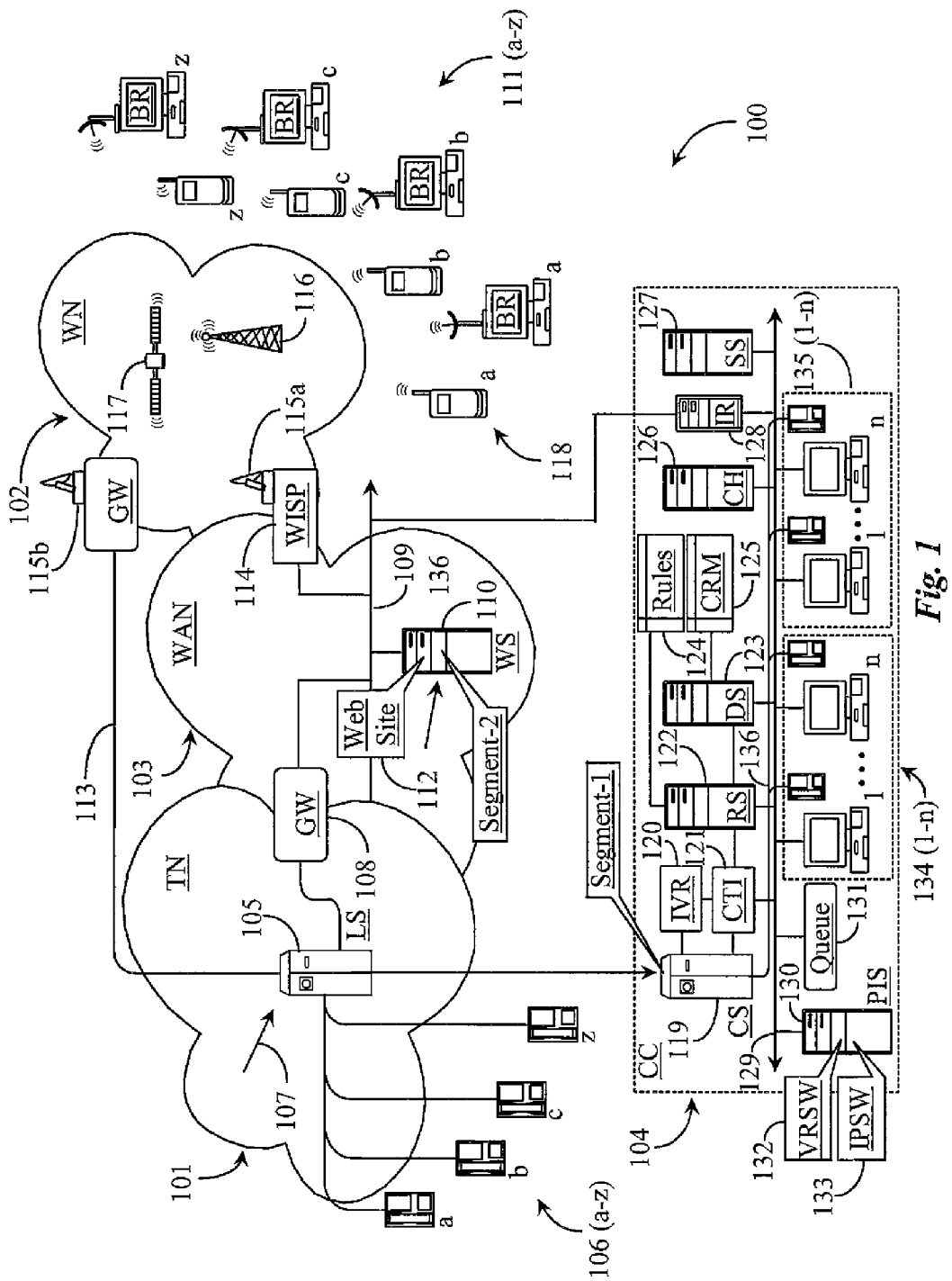
FIG. 1 is an architectural overview of a communications network 100, in which dynamic management of inbound interaction flow is practiced according to an embodiment of the present invention.

FIG. 1 is an architectural overview of a communications network 100, in which dynamic management of inbound interaction flow is practiced according to an embodiment of the present invention. Communications network 100 includes a telephone network (TN) 101, a wireless network (WN) 102, and a wide area network (WAN) that may be the well-known Internet network.

TN 101 may be the well-known public switched telephony network (PSTN). WN 102 may be any digital wireless carrier network supporting a variety of wireless communications devices including wireless Internet-capable appliances. WAN 103 is further illustrated by an Internet backbone 109, which represents all of the lines, equipment, and connection points that make up the Internet network as a whole. Therefore, there are no geographic limitations to the practice of the present invention. In a preferred embodiment all of the network segments included in communications network 100 are publically accessible, so as not to limit the scope of the present invention, although private and corporate networks may also be included in communications network 100 without departing from the spirit and scope of the present invention.

A communications center (CC) environment also known in the art as a contact center or a call center environment 104 is illustrated in this embodiment and is accessible through any one of networks 101, 102, or 103. CC 104 includes a local area network (LAN) 129 disposed therein for supporting communications and service equipment including a number of agent workstations that may be associated in groups illustrated herein as agent group 134 (1-n) and agent group 135 (1-n). Agent groups 134 (1-n) and 135 (1-n) are characterized by groupings of individual agent workstations comprising at least a personal computing appliance and a telephony device for individual agents included in an agent group. The telephony device may be integrated with the computer or separate. Other communications and computing devices may also be present in an agent workstation without departing from the spirit and scope of the present invention like pagers, Laptop computing appliances, Personal Digital Assistants (PDAs), cellular telephones, and the like.

In this example the computing appliances of the agent workstations in each agent grouping are personal desktop computing appliances adapted for LAN communication and Internet access. In this example, each telephony device within an agent workstation is connected via internal telephone wiring 136 to a central telephone switch (CS) 119 disposed within CC 104. CS 119 may be an automated call distributor (ACD) or a private branch exchange (PBX). CS 119 is enhanced for intelligent routing and call processing by a computer telephone integrated (CTI) processor 121 connected to the switch by a CTI link. CTI processor 121 is also connected to LAN 129. CTI processor 121 includes an internal or external digital medium (not illustrated) for holding information and executable software.

CTI processor 121 provides specific routing intelligence and call processing controls to switch 119. Routing strategy is included as a function of a routing server illustrated herein as routing server (RS) 122 connected to CTI processor 121 by a separate data network. RS 122 is also connected to LAN 129. RS 122 includes an internal digital medium adapted to contain information and executable software that enables server function. RS 122 serves routing strategies to CTI processor 121 upon request for intelligent routing of interactions within CC 104.

CS 119 has connectivity to a local telephone switch (LS) 105 disposed within TN 101. LS 105 may be a service control point (SCP), an ACD or PBX switch. Telephone customers 106 (a-z) are illustrated within TN 101 as telephone icons connected to switch 105 by telephone line. Telephone customers 106 (a-z) represent customers or potential customers of CC 104 accessing the center through LS 105 and connected CS 119. A directional arrow 107 leading into switch 105 represents any other potential customers or visitors of CC 104 sourced from TN 101. Callers 107 and 106 (a-z) register at CS 119 for internal routing and are intercepted by an intelligent peripheral illustrated herein as an interactive voice response (IVR) system connected to CS 119 and to CTI processor 121.

IVR 120 interfaces with individual callers into CC 104 to determine identity and intent before being routed to an available agent in the appropriate agent group having the proper training for handling interactions from the associated customer segment such as in agent group 134 (1-n) or in agent group 135 (1-n). In this specification agent groups are also referred to as resource pools (RPs). It is noted herein that telephone customers 106 (*a-z*) may represent proactive engagements or direct inbound traffic. In this example, callers 107 calling in from any TN connected location represent a direct inbound interaction stream with a stochastic characteristic incoming into CC 104 through switch 119. It is also noted herein that CC 104 represents an environment meaning that it is not limited to any single physical location as illustrated herein. CC 104 may be a single physical call center location or it may be part of a federated system of call centers.

TN 101 is bridged to WAN 103 through a gateway (GW) 108 adapted to enable voice callers using telephony communication applications to access center 104 through switch 105. TN 101 is similarly bridged to WN 102 via a gateway (GW) 114b enabled by a wireless transceiver 115b enabling callers connected to the wireless network to access center 104 through LS 105. WN 102 is bridged to WAN 103 via a wireless Internet Service Provider (WISP) facility 114a enabled by wireless transceiver 115a. Facility 114a provides wireless network carrier services including Internet access to callers illustrated herein as wireless callers 118 (*a-z*). GW 114a also enables Internet access to network users illustrated herein as users 111 (*a-z*) operating computing appliances having wireless networking capability. A satellite transceiver 117 and a cell tower 116 are illustrated within WN 102 to depict wireless carrier options.

WAN 103 includes a Web server (WS) 110 adapted with digital medium internal to or otherwise accessible thereto for storing information and software to enable server function. A Web site 112 is stored in WS 110 and provides a digital network access point to services of CC 104 to customers and visitors represented in this example by network users 111 (*a-z*). Network users 111 (*a-z*) access WAN 103 through WISP 114a in this example, however network users operating Internet-capable appliances may also access WAN 103 through TN 101. Likewise, any of wireless callers 118 (*a-z*) may access WAN 103 and WS 110 using Internet access options for wireless phones loaded onto the cellular telephones. Other network users may access server 110 through other carrier networks. These users are represented in this example by a directional arrow 113 leading into WS 110.

The seamless nature of network bridging and the ambiguity of the physical boundaries of disparate networks bridged together for seamless communication is well appreciated by the skilled artisan. It will also be appreciated by the skilled artisan that access to services of CC 104 might also be provided through an automated transaction network (ATM), or a satellite or cable television network adapted to enable Internet access and Web navigation services without departing from the spirit and scope of the present invention.

WS 110 may be hosted by a third party contacting with an enterprise or by the enterprise contracting with CC 104. Web site 112 may contain contact options for customers and visitors to engage CC services offered through the site. These might include email and instant messaging (IM) options as well as instant chat options. Typically there will be options for calling into the center and for scheduling a call back from the center. Such options may be provided in one or more of the Web pages that make up Web site 112 as interactive interfaces.

Within CC 104, LAN 129 supports a data server (DS) 123 connected to RS 122 via a separate network. DS 123 may be adapted with an internal or external digital medium for storing information and software required to enable server function. DS 123 is adapted to provide data to subscribing and. or requesting clients that may be human or that may be automated systems. For example, DS may provide profile information to IVR 120 through CTI processor 121. DS may provide customer relations management (CRM) data to any requesting client or service.

A CRM database 125 is illustrated in this example as a data repository external to but connected to DS 123. CRM 125 may be adapted to store any relevant information about customers of one or more enterprises contracting with CC 104. Billing history, purchase history, customer profiling data, contact information, and the like may be stored on CRM 125. A rules repository 124 is provided within CC 104 and is accessible to DS 123. Repository 124 may contain routing rules used to rout certain types of interactions according to certain conditions within CC 104.

A chat (CH) server 126 is provided within CC 104 and is connected to LAN 129. CH server 126 represents a customer access channel available to network users accessing the center through WS 110 and Web site 112. In one embodiment IVR 120 represents a customer access channel as does Web site 112. An Internet router (IR) 128 is provided within CC 104 and connected to LAN 129. IR 128 is adapted to provide LAN access to WAN 103 on a continual basis. In this embodiment LAN 129 a sub-network of the Internet network such that equipment connected thereto may be considered connected online. In this respect CH server 126 is an Internet-connected server offering a variety of chat services to customers and visitors of CC 104. IR 128 may also represent a router for routing emails and other text messages incoming from WAN 103.

An interaction queue 131 is provided within CC 104 and is established on LAN 129. Interaction queue 131 may be a universal, multimedia-enabled interaction queue that holds pending interactions for all offered groups of agents. In this example queue 131 holds voice and chat requests that are handled by live agents working in group 134 (1-*n*) or in group 135 (1-*n*). Queue 131 may be a prioritized queue or a simple first-in-first-out (FIFO) queue. In this example queue 131 is shared by all of the agents working in groups 134 (1-*n*) and 135 (1-*n*). In other embodiments other queuing facilities might be provided like multiple queues for different agent groups or separate queues based on channel, interaction type, agent skills classification, or other criterion. The inventor illustrates a single interaction queue in this example and deems the illustration sufficient in discussion of the present invention.

CC 104 includes a proactive invitation server (PIS) 130 connected to LAN 129. PIS 130 is adapted to send invitations under certain controlled circumstances to CC customers and visitors when those customers and visitors are engaged with the CC through an access channel, such as an IVR or a Web Site. A statistics server (SS) 127 is illustrated within CC 104 and connected to LAN 129. SS 127 is adapted to compile and report statistics to any subscribing client including automated clients and human clients. SS 124 is adapted with an internal and or external digital medium for storing information and executable software required to enable server function. CTI monitoring of ongoing interactions between customers and agents of CC 104, and those occurring at the Web site and in the CH server, and those interacting with IVR self service options provide server 127 with reportable statistics used for a variety of purposes including routing, load balancing, resource management, and opportunities for proactive involvement of customers and visitors to CC 104 accessing through one of the offered channels. Server 127 may also serve current statistics relative to queue state, agent availability, agent group performance statistics, and agent group availability statistics.

As described above in the background section of this specification, direct inbound interaction flow into CC 104 is stochastic in nature and the transaction rate cannot be controlled with any degree of certainty. The stochastic properties manifest over periods of time where there are peak periods of high incoming traffic and low periods of incoming traffic. Typically speaking, incoming interactions that fall into this stochastic category are live interactions that require live assistance and handling by an agent of the CC.

In this example, incoming interaction flow is segmented for routing to an appropriate agent group for handling. A segment-1 of incoming interaction flow is illustrated at switch 119 and represents all incoming callers to live agents registered at switch 119 and initially intercepted by IVR 120.

A segment-2 of incoming interaction flow is illustrated at WS 110 and represents all Web sourced incoming traffic of the types voice or chat where live assistance is requested. Both segments 1 and 2 may include direct inbound traffic which is not solicited and inbound traffic resulting from proactive solicitation. In one embodiment the inbound interaction flow may be segmented according to interaction flow type where one segment represents all direct unsolicited inbound traffic and one or possibly more segments represent proactively solicited inbound traffic possibly further segmented according to channel or origin of the interactions. In another embodiment a segment of inbound traffic represents all inbound interactions requiring a specialized agent group with a specific skill set for resolution. In this case multiple segments may map to multiple agent groups for resolution wherein the segment description mirrors the skills level and skills set of the primary agent group assigned to handle that segment.

PIS 130 has a visitor ranking software (VRSW) 132 provided thereon and adapted for ranking visitors to CC 104. Visitor ranking results from observing visitor behavior relative to the visitor navigating a specific access channel. For example, Web visitors may make up a large part of proactively solicited engagements. Visitor ranking can occur at any channel through which customers and visitors access the CC. For example, Web customers and visitors may be ranked according to navigation behavior, click behavior, and profile data that may be available about the client. Further ranking of the customer or visitors can also be based on auxiliary information known about the customer or visitor such as profile information, purchase history, income status and other demographics.

For IVR callers, the ranking system might rely on behavior of the caller while navigating the IVR self service menu such as selection choices, mood, navigation proficiency, and the like. Similarly, additional information known about the customer may also be used to establish some rank for the customer. In some cases of new visitors, no information has been collected about them. These visitors are potentially, new customers of CC 104. A caller that is already engaged in a live conversation with an agent might also be ranked for a proactive invitation. In this case the caller may be engaged with an agent in a service conversation wherein the proactive invitation seeks to engage the caller into a sales transaction.

In this example VRSW 132 is used to automatically qualify customers and visitors for proactive invitation according to observed behavior and a probability that the proactive invitations will lead to a successful result like a sale, for example. In a proactive invitation system there is a probability that the invitation will be accepted. This probability value might be termed a hit rate. Of invitations that are accepted, another probability relates to whether or not an agent assisting the customer or visitor will achieve the desired goal such as a sale, for example. In addition to ranking customers and visitors for proactive invitation, VRSW 132 may also determine which of multiple types of proactive invitations should be sent to a specific customer. This determination may be made during the observation and ranking process.

Proactive invitations sent to customers and visitors after observation and ranking have a much higher probability of success than automated invitations sent to any or all visitors or customers without ranking. The goal of ranking then is to increase the probability of successful results. PIS 130 has an invitation pacing software IPSW 133 provided thereon and adapted to control or throttle the rate that proactive invitations are sent out to qualified customers and visitors. Pacing proactive invitations is accomplished by a pacing algorithm that takes into account several parameters among which segment activity defined as interaction handling statistics for a segment is considered. In a preferred embodiment the intensity of outgoing proactive invitations is controlled by the pacing algorithm to be substantially inversely proportional to the intensity of direct inbound unsolicited traffic.

Proactive invitations may take a number of different forms. For example, a popup, toast, or some other visual indicia can be activated in a Web session of a customer or visitor. The invitation may be an instant message or a system chat line in a chat session. A proactive invitation may be in the form of a suggestion to a live agent to recite a specific invitation dialogue to a customer the agent is interacting with. By pacing the frequency of sending proactive invitations to visitors and customers of CC 104, the system of the invention can be used to supplement for a lack of direct inbound unsolicited interactions. In this case pace of invitation sending is increased to generate more interactions to keep agents from idleness. In a case where the unsolicited interaction flow is peaked and no agents are available to answer more interactions, the pace of proactive invitation sending can be reduced or halted temporarily until agents become available to answer new interactions.

In one embodiment the intensity of proactive invitation can be controlled per customer segment. For example, if a customer segment for new mortgages has a low arrival rate of unsolicited inbound interactions leaving agents underutilized, the intensity of proactive invitations relative to new mortgages can be increased while the proactive invitation intensity for some other segment is unchanged or simultaneously decreased. In a case where there is a single product or service offered, a segment might be defined as all unsolicited incoming interactions and another segment might define all proactively solicited interactions. In this case throttling the proactive invitation frequency has more definite results because all of the proactive invitations are paced against the current frequency of arrivals of unsolicited interactions. In more complex cases there may be several products and services and multiple customer segments and multiple agent groups of specified skills for handling each segment. In some cases, proactively solicited inbound traffic is blended with unsolicited inbound interactions for each segment and proactive pacing is performed per segment and agent group.

In one embodiment resource pools (agent groups) have a hierarchal structuring such that the most profitable agent group for a customer segment is the primary resource pool for routing interactions from the segment to the group. In one embodiment one segment may have more than one resource pool ordered by such priority in skill level, proficiency, and therefore profit model. In one embodiment a primary resource pool associated with one customer segment is a backup resource pool for another segment. In this way every primary resource pool or primary group of agents for one segment has a lower priority backup group that may also take interactions from another segment and may also be the primary resource pool for the other segment. When inbound interactions are redirected from one over-utilized primary agent group to an assigned backup agent group, the process is known as agent balancing. One segment may have multiple resource pools ordered by profitability such that the routing strategy seeks to occupy agents in the most profitable resource pools before utilizing resource pools that are less profitable.

The system of the invention may be entirely automated running entirely on real-time statistics for pacing proactive invitations against the arrival rate of unsolicited interactions. From a predictive standpoint, proactive invitations that are accepted by customers or visitors are more likely to lead to a positive result than unsolicited interactions because the transaction involves a level of pre-agreement between the CC and the customer or visitor. Routing these interactions to the most profitable resource pools can dramatically increase the profit rates of those resource pools. Unlike a standard outbound calling campaign, there is no delay in creating a live interaction from a self service visit. Outbound calling from customer or visitor lists carries a much higher failure rate including call that go unanswered and answered calls that are abandoned in queue. Moreover, proactive invitations have a many to many relationship when mapping to multiple resource pools and segments whereas outbound campaigns carry a one to one relationship such as one resource pool answering all of the connected outbound interactions.

Figure 2:
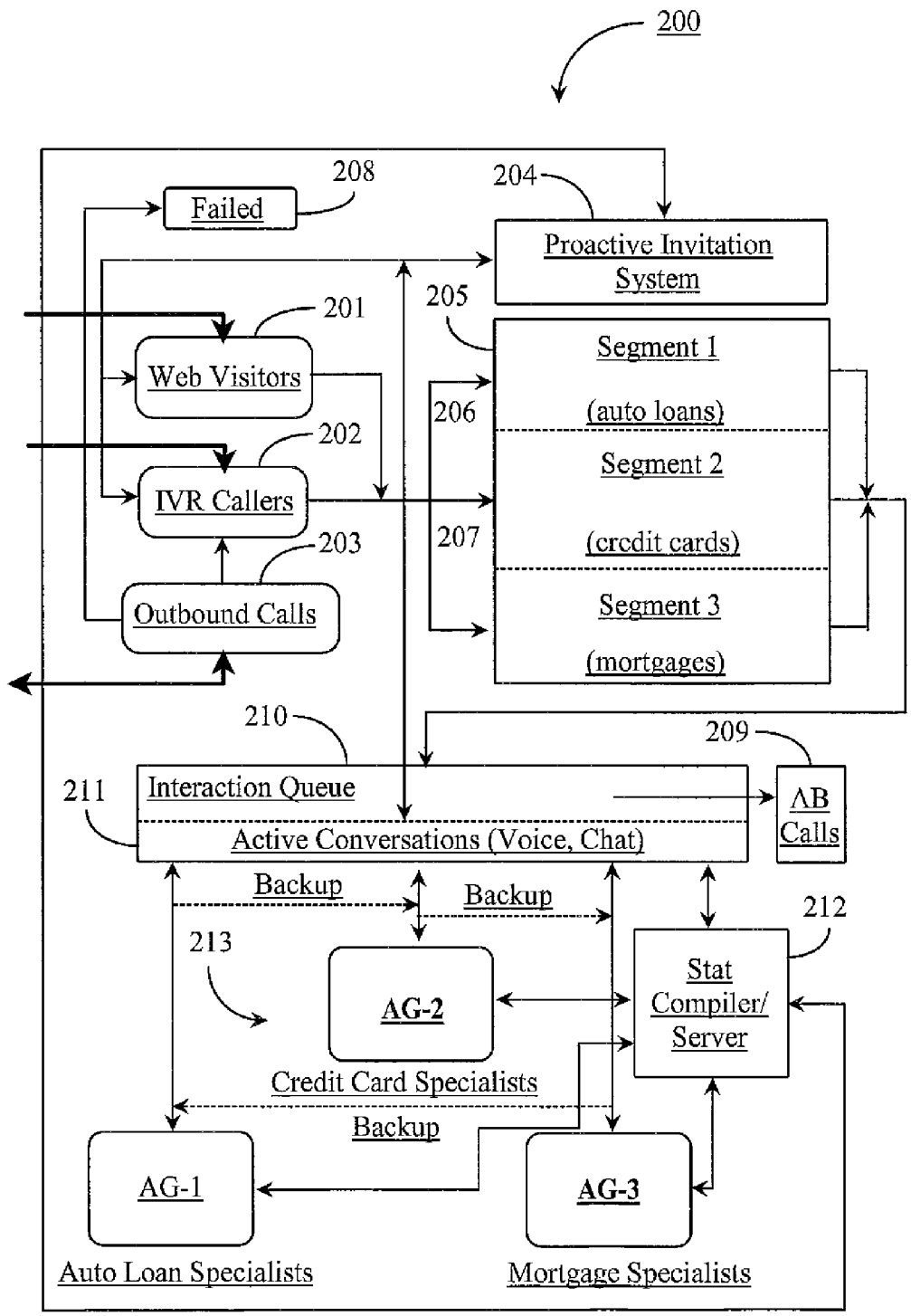
FIG. 2 is a block diagram illustrating a call-center service model wherein incoming interactions are segmented and mapped to agent groups according to an embodiment of the present invention.

FIG. 2 is a block diagram illustrating a call-center service model 200 wherein incoming interactions are segmented and mapped to agent groups according to an embodiment of the present invention. Model 200 includes a customer access channel 201 labeled Web visitors. Channel 201 includes all interactions requiring live assistance that are generated through Web-based resources, for example a Web site, chat interface, Web interactive, Webinar, or other Web-based interfaces. Model 200 includes a customer access channel 202 labeled IVR callers. IVR callers may include unsolicited callers seeking live assistance and IVR visitors engaged in some IVR self service. These callers are subject to proactive invitation based on ranking Model 200 includes another customer access channel 203 labeled outbound calls. Outbound calls 203 may materialize as inbound traffic intercepted by the IVR system from an outbound call server (OCS). From a predictive standpoint some of the outbound contacts will result in failed attempt 208. In this case the customer access channels 201, 202, and 203 are not considered customer segments. Also in this example unsolicited inbound interactions may arrive through channel 201 and through channel 202.

Model 200 has three basic customer segments ordered by type of product and service offered. These are segment 1 (205) for auto loans, segment 2 (206) for credit cards, and segment 3 for mortgages. The segments may represent both product and servicing or just new product, leaving account service to other segmentation. For routing purposes, all customers interested in auto loans are mapped to segment 1. All customers interested in credit cards are mapped to segment 2. All customers interested in mortgages are mapped to segment 3. In this model segments 1-3 are considered routing targets having one or more specialized resource pools to handle interactions mapped to the corresponding segment.

Segment 1 (auto loans) is mapped to a primary resource pool of agents labeled agent group (AG)-1 that specializes in processing new auto loan applications. AG-1 is the most profitable group to handle auto loan business. Segment 2 (credit cards) is mapped to a primary resource pool of agents (AG-2) that specializes in processing new credit card applications. AG-2 is the most profitable group to handle credit card requests. Segment 3 is mapped to a primary resource pool (AG-3) that specializes in processing new mortgage applications. AG-3 is the most profitable group to handle new mortgages. Each segment 205-207 may have more than one resource pool designated to handle interactions from the associated segment. A segment is considered a routing target and the resource pools are assigned by cost and profit priority to handle interactions from each segment.

In this example there is only one AG assigned to handle each segment. In this example, each segment (205-207) may include direct unsolicited inbound requests for live assistance and proactively solicited inbound requests for live assistance. The proactively solicited inbound interaction flow is particularly valuable to agents because the customers or visitors are ranked according to a probability threshold that an agent from the primary group associated with the segment will be able to process the request with positive results equating to new business.

The total incoming interaction load is a blend of direct unsolicited inbound requests for live assistance, inbound requests resulting from outbound contact, and proactively solicited requests for live assistance resulting from proactive engagement of customers and visitors. The proactive invitations are paced in this embodiment based on the availability and performance of each primary agent group for each segment. Therefore, each primary agent group is backed up by a secondary resource group that may also take interactions from another segment.

In this example, AG-3 is a backup resource pool to AG-1. The agents in AG-3 have a lower proficiency level in processing auto loan requests because their specialty is mortgages. However, if all of the agents in AG-1 are busy, interactions from segment 1 may be routed to AG-3 for handling. AG-1 is a backup resource pool for AG-2. The agents in AG-1 have a lower proficiency rating in handling credit card requests than the agents in AG-2 because they specialize in auto loans. However, if all of the agents in AG-2 are busy answering interactions for that segment, AG-1 may take surplus interactions from segment 2. AG-2 is a backup resource group to AG-3. The agents in AG-2 have a lower proficiency rating for handling new mortgage requests that the agent in AG-3 because mortgages is not their specialization.

At any given moment during a campaign period, each segment is receiving new interactions for routing the interaction flow characterized by a tracked arrival rate (AR). Interaction queue 210 carries a current arrival rate for each segment. Queue 210 also tracks an interaction abandonment rate (AB) for each segment. In one embodiment, each segment 205-207 has an AB threshold value that when breached causes the system to act to balance agents among the primary and secondary resource groups working the segment.

A proactive invitation system 204 analogous to PIS 130 of FIG. 1 is provided to enable automated proactive engagement of Web visitors and IVR callers. In some cases proactive invitations may also be sent to agents engaged in live conversations illustrated herein as active conversations 211. The invitation in this case may be sent to the agent in the form of a suggested invitation dialog that the system prompts the agent to recite for the customer or visitor. The proactive invite may also appear as a system chat line plugged into a conversation between an agent and one or more visitors.

System 204 receives statistics from a statistics compiler/server 212 analogous to SS 127 of FIG. 1. Compiler/server 212 receives statistical data from each of the AGs working the corresponding segments. Stat compiler/server 212 also receives statistics from queue 210 including current agent conversations in progress (211). System 204 may pace or throttle the frequency of send of proactive invitation to any segment that receives them. Compiler/server 212 has access to the AB stats for each segment of the campaign as well as the AR for each segment of the campaign. Compiler/server 212 also has the latest stats on agent availability for the primary resource groups of each segment. Other stats may also be collected and reported such as estimated waiting time (EWT) in queue 210 total and for each segment. Compiler/server 212 may also receive stats like average handling time (AHT) per interaction for each AG. Compiler/server 212 may also report statistics relative to the estimated number of agents in each RP that might be required to stay busy in order to maintain a service level objective (SLO) of the CC as a total figure for all active segments and as a value broken down for each active segment.

It is assumed in this example that each of segments 205-207 is also receiving direct unsolicited interactions in a way that is not predictable but is stochastic in nature. For any secondary AGs a threshold relative to the number of idle agents in the group may be established as a condition allowing the group to receive interactions in backup mode. That is to say that for a secondary or backup resource pool to receive interaction from a segment having a primary resource pool, a certain number of idle agents must be reported. This threshold value may be higher for AGs having a lower proficiency rating and lower for AGs having a higher proficiency rating for their segments. Another condition for redirecting traffic to a secondary resource pool may be that no more interactions can be routed to a primary AG for a segment because all agents in the group are currently busy. There may be sub-conditions to the busy condition such as an AB creeping beyond a pre-set threshold or an EWT value that exceeds a preset time window.

Under ideal traffic conditions, each segment is handled exclusively by the primary AG assigned to that segment. There are enough agents available to handle direct unsolicited interactions, the pace of connected outbound calls, and the pace of proactively solicited interactions incoming into the segment. Under these conditions the arrival rate of unsolicited inbound interactions is such that there are some idle agents available in the primary group to take outbound calls and proactively solicited inbound interactions. Outbound calling is not required in this example to practice the invention, however outbound calls can be predictively placed and paced to provide supplemental interactions along with supplemental interactions provided through proactive invitation. Proactive invitations may have a higher probability of successful result than connected outbound calls and therefore may be prioritized over outbound calling such that if there are enough prospects that qualify for predictive proactive engagement, outbound calling may be suspended altogether.

If unsolicited interaction load plus proactively solicited interaction load is sufficient to fully utilize agents in the primary resource group outbound calling may be suspended. The pace of proactive invitation is controlled with respect to the current unsolicited interaction load such that enough proactive invitations are sent out so that the predicted inbound interaction load will occupy the remaining idle agents in the group without compromising the SLO parameters for the segment. In one embodiment proactive invitation system 204 accounts for estimated off-line task load for agents working the segment and incorporates this parameter into a pacing algorithm for throttling proactive invitations sent to customers and visitors of the CC.

When stochastic fluctuations occur within a segment, the pacing engine (processor running the algorithm) increases or decreases the frequency of proactive invitations accordingly. For example, assume that the rate of abandoned calls 209 in queue 210 for segment 1 has exceeded the allowable threshold. No new interactions can be routed to AG-1 under this condition. System 204 checks statistics for AG-2, which is a backup group for AG-1. If there are a sufficient number of idle agents in this group, the next interactions for segment 1 are routed to the secondary or backup resource pool for handling. Simultaneously, system 204 reduces the frequency of proactive invitations sent out to customer and visitors that qualify for invitation and that qualify for treatment according to the goals of the segment. The instant reduction lowers the total load of inbound interactions for segment 1 relieving the pressure on AG-1 by freeing up a few agents to answer new interactions. After the system settles, proactive invitation system 204 may ratchet up the frequency of proactive invitations to take up the slack, if any created by the previous reduction adjustment.

It is possible that the AB for segment 1 can be breached at a time when there are no agents available in the backup group because they are busy answering interactions from segment 3, which may also have a high arrival rate but no abandoned calls (90 to 100% agent utilization). In this case proactive invitation system can reduce proactive invitation frequency to segment 3 hopefully freeing up some agents to work backup from segment 1. In one embodiment reducing proactive invitation frequency affects all of the segments because the generated interactions are not segmented until they arrive in the CC for routing. In this case all segments experience a reduction in total interaction load. The routing strategy can monitor this reduction and can observe agent states through a subscription to the statistical compiler/server. If the reduction frees up a sufficient number of agents working AG-1, these agents will then be preferred destinations for new segment 1 interactions. If AG-2 produces a sufficient number of idle agents before AG-1, then those agents will be utilized as backups for segment 1 traffic until sufficient numbers of agents are again available in AG-1 to handle segment 1 interactions.

In one embodiment the intensity of unsolicited inbound interactions drops causing the arrival rate of interactions to segment-1 to drop below a threshold value. It is assumed in this case of blended interaction flow that the other segments will also experience a dip in arrival rate during this wan period in stochastic interaction flow. Segment 1 now has a sufficient number of idle agents in AG-1 to work interactions. AG-3 stats may indicate that all of the agents are busy answering calls from segment 3 despite the reduction in proactive invitation frequency. This can be caused by more interactions being directed to segment 3 naturally then to segment 1. This is unlikely to occur especially if the segments are ordered by popularity meaning that segment 1 would have more interactions as a rule than segment 2, which would as a rule have more interactions than segment 3.

In one embodiment, the routing server makes the final routing decision for excess segment interactions and therefore may temporarily reassign another agent group with a sufficient number of idle agents qualified to serve segment 1 as a backup system. In one embodiment there is more than on agent group working segment 1. In this case all AGs are checked for agent idleness and the highest priority of these groups having sufficient number of agents to answer calls will receive excess interactions for segment 1. In WAN periods the intensity of proactive invitation can be raised as long as there are enough prospects ranked for receiving the invites. If arrival rate is low for a primary resource pool and the backup resource pool also has a slow arrival rate, the proactive invitation system can ratchet up to fill the demand and outbound dialing frequency can also be included in the mix. In all cases where total profit (TP) per interaction for an agent group is used in group assignment and structuring ready agents in the most profitable group will be utilized first.

Figure 3:
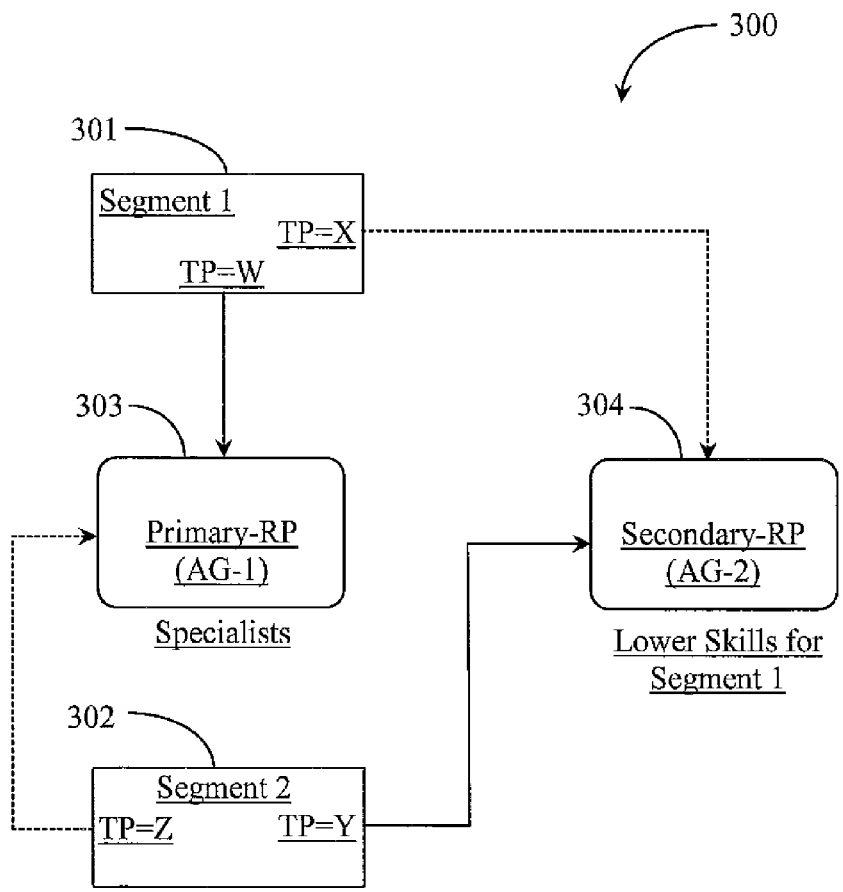
FIG. 3 is a block diagram illustrating customer segments and resource pools for handling interactions according to an embodiment of the present invention.

FIG. 3 is a block diagram illustrating customer segments and resource pools for handling interactions according to an embodiment of the present invention. An interaction management system 300 is illustrated in this example and includes two customer segments illustrated herein as a segment 1 (301) and a segment 2 (302). Each segment has a primary resource pool and a secondary resource pool. For segment 1, the primary resource pool is RP 301 (AG-1). The secondary or backup resource pool is RP 304 (AG-2). AG-2 is the primary resource pool for segment 2 (302), but is ranked lower in skills relative to segment 1 skills requirements. Resource pool 303 is the backup pool for segment 2 (302), which is the primary pool for segment 1.

Segment 1 has a total profit per interaction (TP) value of W with AG-1 and a total profit per interaction of X relative to AG-2 where W>X. Segment 2 has a TP value of Y for the primary resource pool AG-2 and a TP value of Z for the group AG-1 where Y>Z. The most proficient use case is that each segment utilize only the primary agent groups to handle incoming interactions. Total profit per interaction is a function of product revenue multiplied by a probability of positive result (typically a sale) minus the constant fixed cost of maintaining the primary AG plus the cost rate average of the AG multiplied by the average handling time (AHT) per interaction. It may be expressed as $$TP = ProductRevenue * Probability\ OfSale - (Constant-Cost + CostRate * AHT).$$

Product revenue may be considered the price of the product or service to be offered to a customer and this value is assigned to a segment where the segment reflects a product or service. Probability of sale is a value of the probability that an agent from the primary resource pool of the link will sell the product to a customer from the segment of the same link. Constant cost is considered the average cost per interaction for any resource pool (AG). Constant cost is not dependant on any time interval. AHT is the average handling time per interaction by an agent. This value may be estimated for a group. Cost rate is the cost per interaction per time unit. This value may be estimated for a group. All of these parameters are included with other input data to the pacing system, more particularly the pacing algorithm used to throttle proactive invitation distribution. Of all of the parameters, only the value product revenue is assigned to a segment whereas all other parameters are assigned to the link between the segment and the primary resource pool.

In this example, segment 1 may be a product like a new computer and segment 2 might be a service contract for serving the computer for a period of time. The agents in RP 303 are specialists in selling new computers while the agents in RP 304 are expert in selling the service contracts. It also makes sense in this example that all unsolicited inbound interactions are routed to segment 1 as well as all proactively solicited interactions unless they already have the computer and are proactively solicited later for the service package in which case accepted invites would be routed only to segment 2. One reason for this consideration is that a customer must first buy the computer and then be offered the service package. Upon acceptance the customer might be routed from segment 1 after purchasing the computer to segment 2 to purchase a service contract for the just-purchased computer. Some customers will not get a service package and some others may purchase a service package at some later time.

In this example the hierarchy extends to the segments where segment 1 is the most important (main product) and the primary RP 303 is the most profitable group for handling new computer orders. Segment 2 is of lower importance (value addition) and RP 304 while the most profitable group for segment 2 remains lower in profitability than RP 303 for segment 1. As was described previously, when unsolicited interactions routed to segment 1 are too many for the agents to handle, interactions may be routed to RP 304 provided there are sufficient numbers of idle agents to work those interactions. Proactive invitation frequency may be reduced to free up more agents in RP 304 to answer overflow interactions from segment 1 depending on the intensity of the interaction flow. Reducing the proactive invitation frequency in this case may affect RP 303 (AG-1) more than it would RP 304 (AG-2) because segment 1 is generally a first stop in the system to buy the computer. Proactive invitation strategy for segment 2 would be to solicit visiting customers who have already purchased a computer but did not receive any service package or perhaps might be upgraded to a better service package newly offered.

By virtue of the structure of system 300, a large percentage of customers may be redirected from segment 1 after a transaction has completed to segment 2 to look into the offered service packages. In this case a general reduction in proactive invitation intensity may or may not free up agents working in the primary RP for segment 1 because of the stochastic nature of the unsolicited inbound requests. However, is may be assumed that segment-2 will have somewhat less pressure assuming not all customers will take the service package. If unsolicited inbound traffic remains too high for segment 1, interactions may be routed to segment 2 for handling if there are available agents. If the intensity of inbound interaction flow becomes too high for AG-1 and AG-2 for segment 1, another agent group could be assembled and added to the system. In this case proactive invitation would probably be suspended until enough agents became ready again to work proactively solicited inbound interactions.

Figure 4:
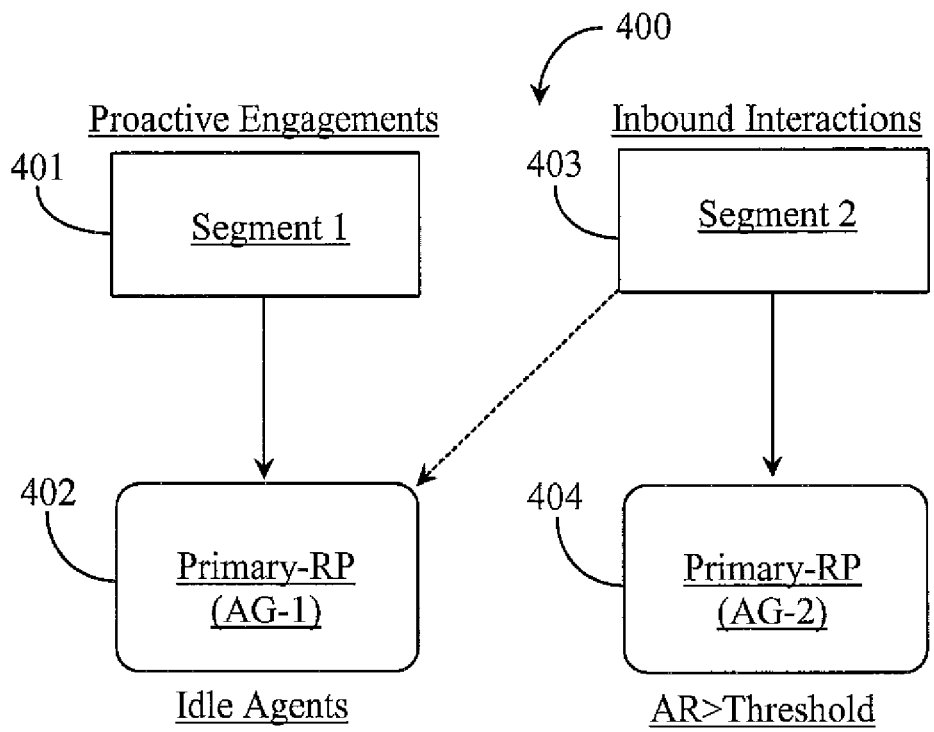
FIG. 4 is a block diagram illustrating agent balancing during a peak interaction period according to an embodiment of the present invention.

FIG. 4 is a block diagram illustrating agent balancing during a peak interaction period according to an embodiment of the present invention. Use case 400 includes two customer segments, segment 1 (401), and segment 2 (403). Each segment has a primary RP (AG). RP 404 is the primary pool for segment 2 while RP 402 is the primary pool for segment 1. In this example, segment 1 only takes proactively solicited inbound interactions and segment 2 only takes unsolicited inbound interactions.

Segment 2 may have a relatively high inbound arrival rate that causes call abandonment in the queue for that segment to rise beyond an acceptable threshold. Segment 1 may have plenty of prospects to receive invitations or it may have few prospects. In this case the pacing algorithm may estimate how many agents would be sufficient to take inbound interactions and satisfy the SLO of the CC. It is assumed here that AG-1 has some extra ready agents. They can be reassigned to Segment 2 by adding AG-1 to the routing targets for this segment. Proactive invitation frequency for segment 1 may be reduced to free up some agents to work overflow from segment 2.

Figure 5:
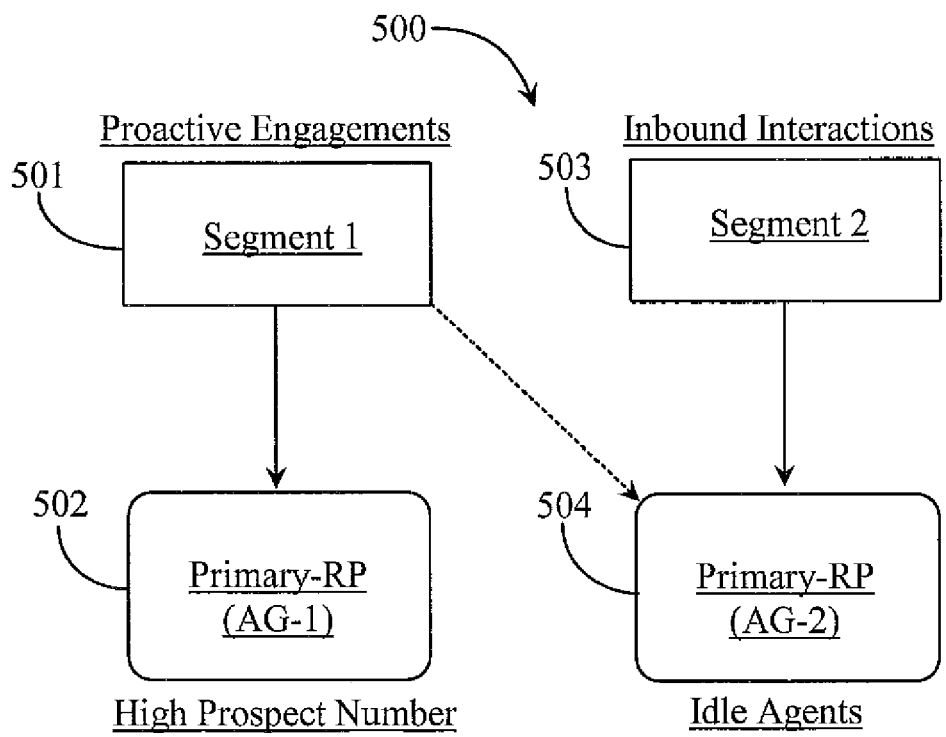
FIG. 5 is a block diagram illustrating agent balancing during a trough in interaction flow according to an embodiment of the present invention.

FIG. 5 is a block diagram illustrating agent balancing during a trough in interaction flow according to an embodiment of the present invention. Use case 500 includes a segment 1 (501, a segment 2 (502), a primary RP 502 for segment 1 and a primary RP 504 for segment 2. In this case segment 2 (inbound interactions) has a low arrival rate and idle agent are present in primary RP 504. On the other side of the coin, the proactive segment 501 is may be engaged in a robust proactive campaign where all or most agents in the primary RP 502 are busy with customers. Some interactions can be routed from segment 1 to segment 2 for handling by the extra ready agents in RP 504 (AG-2). Depending on the circumstances, proactive invitation frequency may be increased in this case to keep the agents in AG-2 busy until the arrival rate for unsolicited inbound interactions rises again for segment 2. In one embodiment where unsolicited inbound interaction arrival rate is low and the prospects for proactive invitation are scarce, an outbound campaign can be launched to help make up for lack of interactions. Offline tasks can also be assigned to ready agents during such low interaction flow periods.

Figure 6:
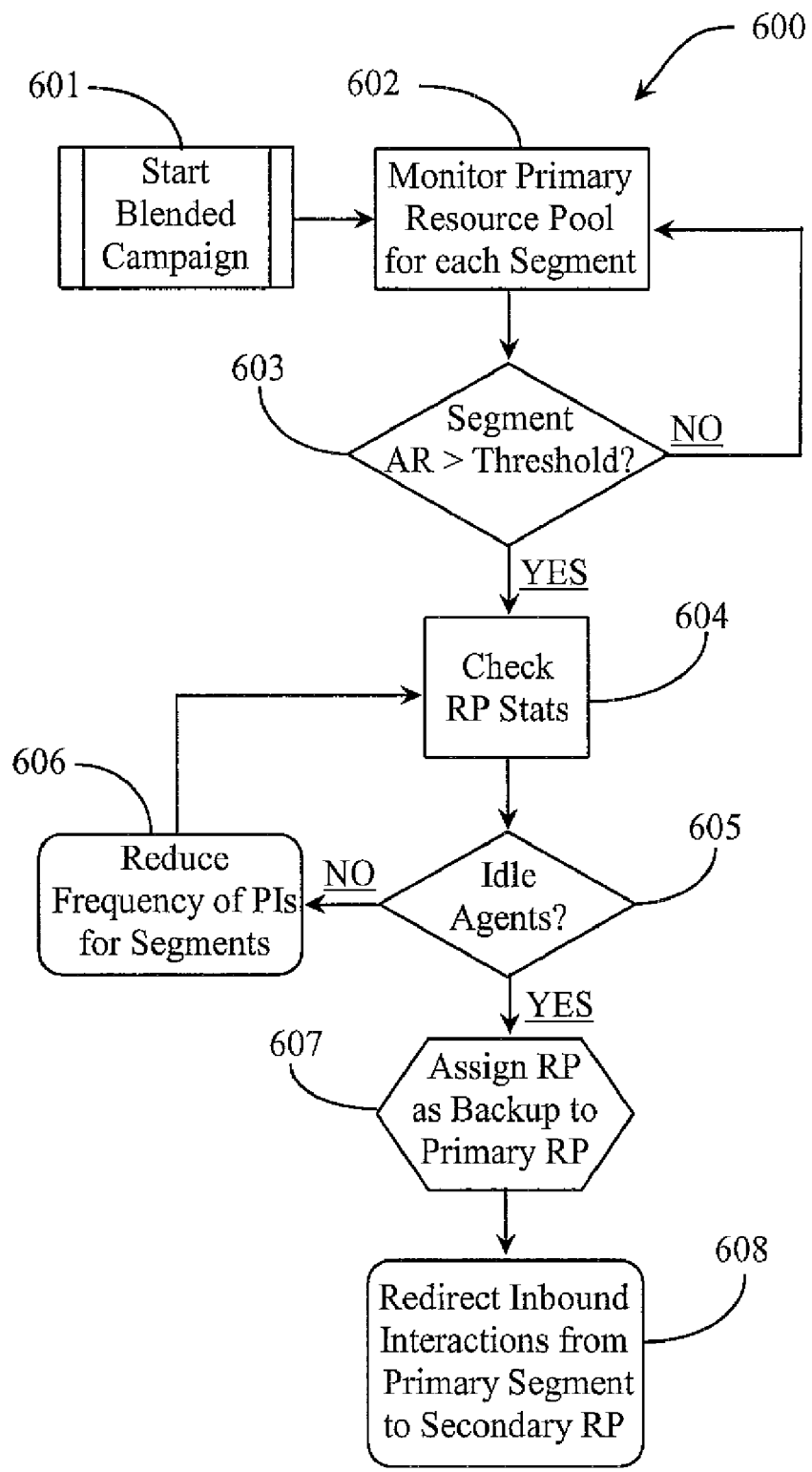
FIG. 6 is a process flow chart illustrating steps for agent balancing according to an embodiment of the present invention.

FIG. 6 is a process flow chart 600 illustrating steps for agent balancing according to an embodiment of the present invention. At step 601 the CC launches a blended campaign, meaning that unsolicited inbound traffic and proactively solicited inbound traffic are answered by one or more agent groups with specialized skill level. It is assumed in this example that interactions are segmented according to a customer segment schema.

At step 602, the activity and capacities of each primary resource pool for handling interactions from each customer segment are monitored for available statistics. At step 603 a decision is whether the call abandonment rate (AB) for any active segment is greater than a preset threshold. In this step a call abandonment rate that exceeds the threshold indicates that there are not enough ready agents or there are no ready agents in the primary RP handling interactions from the segment. If at step 603 the system determines that all is well and no segment is experiencing too much interaction flow, the process resolves back to monitoring at step 602.

If the system determines that one or more customer segments is experiencing a call abandonment rate that is higher than an allowed rate, the monitor checks the activity status of any secondary resource pool or pools allowed to handle interactions from the same segment or segments at step 604. A resource pool is typically a group of agents with specialized skills for handling interactions from a specific customer segment. It is noted herein that one segment may be mapped to more than one resource pool. The most profitable resource pool of multiple resource pools for any segment is considered the primary resource pool for handling interactions from the segment.

The system determines at step 605 if there are any idle agents in any of the secondary resource pools assigned to the customer segment. A secondary resource pool may be a backup resource pool that also takes interactions from another segment. If the system determines that there are no idle agents in any secondary resource pools for the segment and the primary segment continues to be over utilized, then the pacing algorithm in place to throttle proactive invitation intensity reduces the frequency of proactive invitation at least for the segment having a high call abandonment rate. The system continues monitoring primary and secondary resource pools charged with answering interactions from the segment back at step 604. The system again determines based on monitoring, if there are any idle agents freed up to answer interactions from segment 1 at step 606.

If the system determines that there are enough idle agents to justify re-direction of interactions to a secondary group, the system may assign the secondary RP with the idle agents as a backup RP to the segment having the high abandonment rate. In one embodiment the secondary RP is already pre-assigned to the customer segment and interactions may be redirected to that secondary segment at step 608 upon discovery of agent availability in that RP during the initial routing process for each incoming interaction incoming into the segment. It is noted herein that unsolicited inbound interaction flow and proactively solicited interaction flow may be routed initially to the segment for processing via the primary resource group when possible and secondary resource groups where feasible. Secondary groups are not as profitable for the segment as the primary RP for the segment is.

Idle agents in secondary pools may be engaged only if no more interactions can be routed to available agents in the primary pool as evidenced by a threshold breach of call abandonment rate for that segment or through some other preplanned indicator like exceeding an allowable estimated wait time in queue for a primary agent to answer the interaction. Therefore, the secondary RPs are likely to stay busy with interactions from their own segment that they are primary to and with proactively solicited interactions as long as the stochastic inbound interaction flow is being successfully processed according to CC SLO. During peak periods of unsolicited interaction flow, the proactive campaign is throttled down to free up more agents to handle incoming interactions from the segment. During a trough in stochastic incoming traffic, proactive solicitation frequency may be increased so that the number of agents that are underutilized is reduced or eliminated for the time being. As the stochastic nature of the unsolicited interaction flow changes, so to does the intensity of the proactive engagement campaign.

Figure 7:
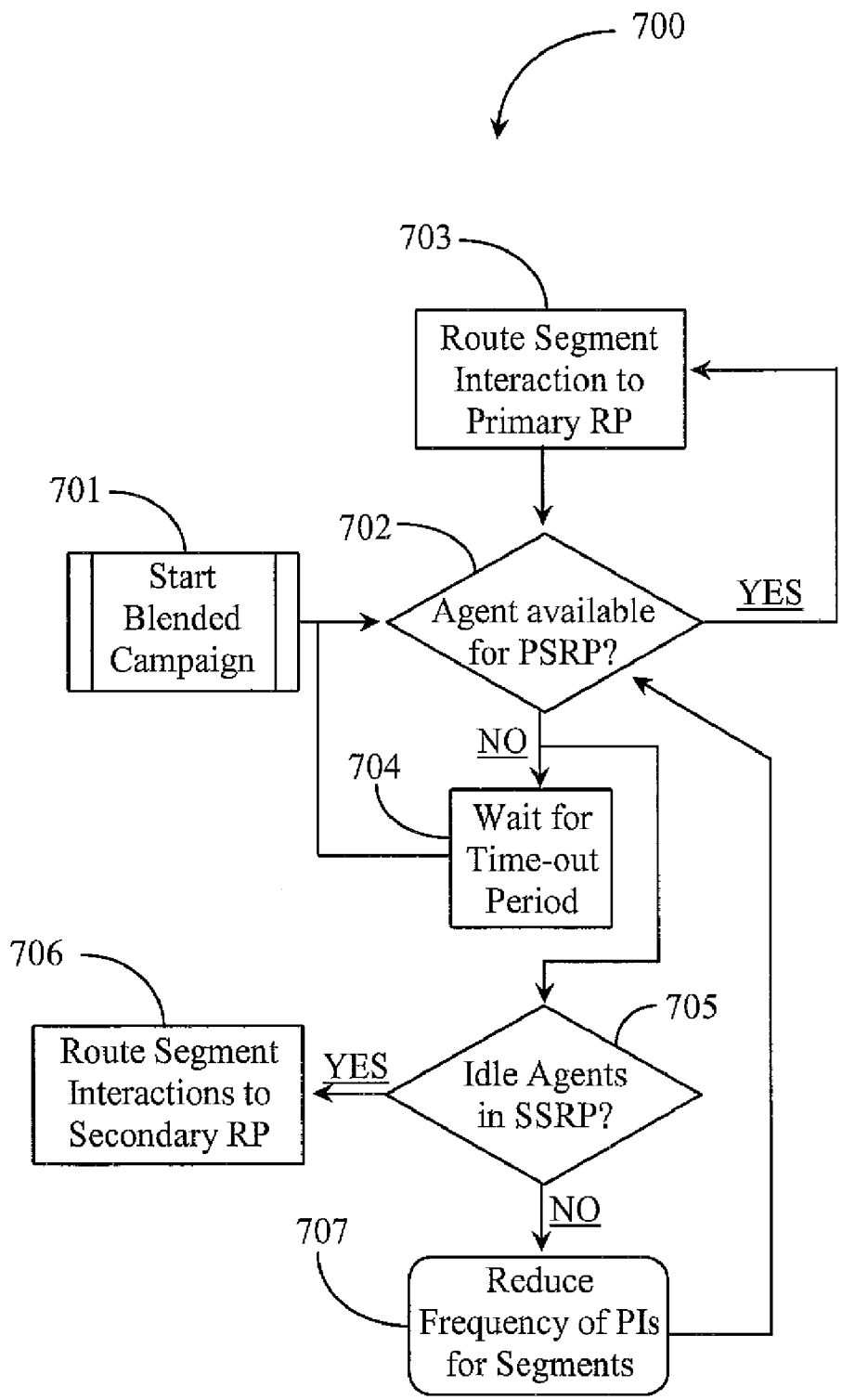
FIG. 7 is a process flow chart illustrating steps for agent balancing according to another embodiment of the present invention.

FIG. 7 is a process flow chart 700 illustrating steps for agent balancing according to another embodiment of the present invention. At step 701, the CC launches the blended campaign of unsolicited inbound plus proactively solicited inbound. The system determines at step 702 during routing of the first interaction if there are any agents available in the primary resource pool being utilized. If the system determines at step 702 that there are ready agents in the primary resource pool for the segment, the routing unit routes the interaction to the target for further processing by the primary RP at step 703.

If the system determines that there are insufficient agents or no available agents in the primary RP to take an interaction from the segment, a time out period may be exercised at step 704. The time out period gives a chance for an agent to become available in the primary RP so the next interaction may be processed. After the time out at step 704, the process moves back to step 702 to check again for agent availability to answer the interaction from the primary RP. The focus on the primary RP stems from the fact that it is the most profitable group to handle interactions from the segment. If there is still no agent to take the interaction after the time out has expired, the routing system checks for agent availability in the secondary RP at step 705. A secondary RP for a segment is an RP that has a lower profitability rating for that segment and a lower skills level for handling interaction from the segment.

If there is an agent available in the secondary RP, it may mean that the segment associated with the secondary RP has a lower arrival rate of unsolicited inbound interactions and proactive engagements for that segment are not enough to fully occupy all of the agents in the secondary RP. Upon determining at step 705 that an agent in the secondary RO is available, the interaction is redirected from the primary RP to the secondary or backup RP for handling. This situation is not desirable for many interactions because the primary RP delivers more service, proficiency, and profit for the segment. Therefore, at step 707, the proactive invitation system reduces the frequency of proactive engagements for the segment or all segments in order to obtain agent availability in the primary segment for continuing to handle interactions from the segment. Proactive invitation may be practiced according to segment or it may be practiced across the board for all segments allowed to receive proactive engagements.

Step 707 is practiced mainly to relieve pressure on the primary RP for the segment. Therefore, the process resolves back to step 702 after reducing the number of proactive invitations sent to prospective customers to see if ready agents can be found for routing further interactions from the segment. In this example the segment is allowed to receive both unsolicited inbound interactions and proactively solicited interactions. Reduction of the proactive interaction flow is controllable to a predictable degree of accuracy.

Figure 8:
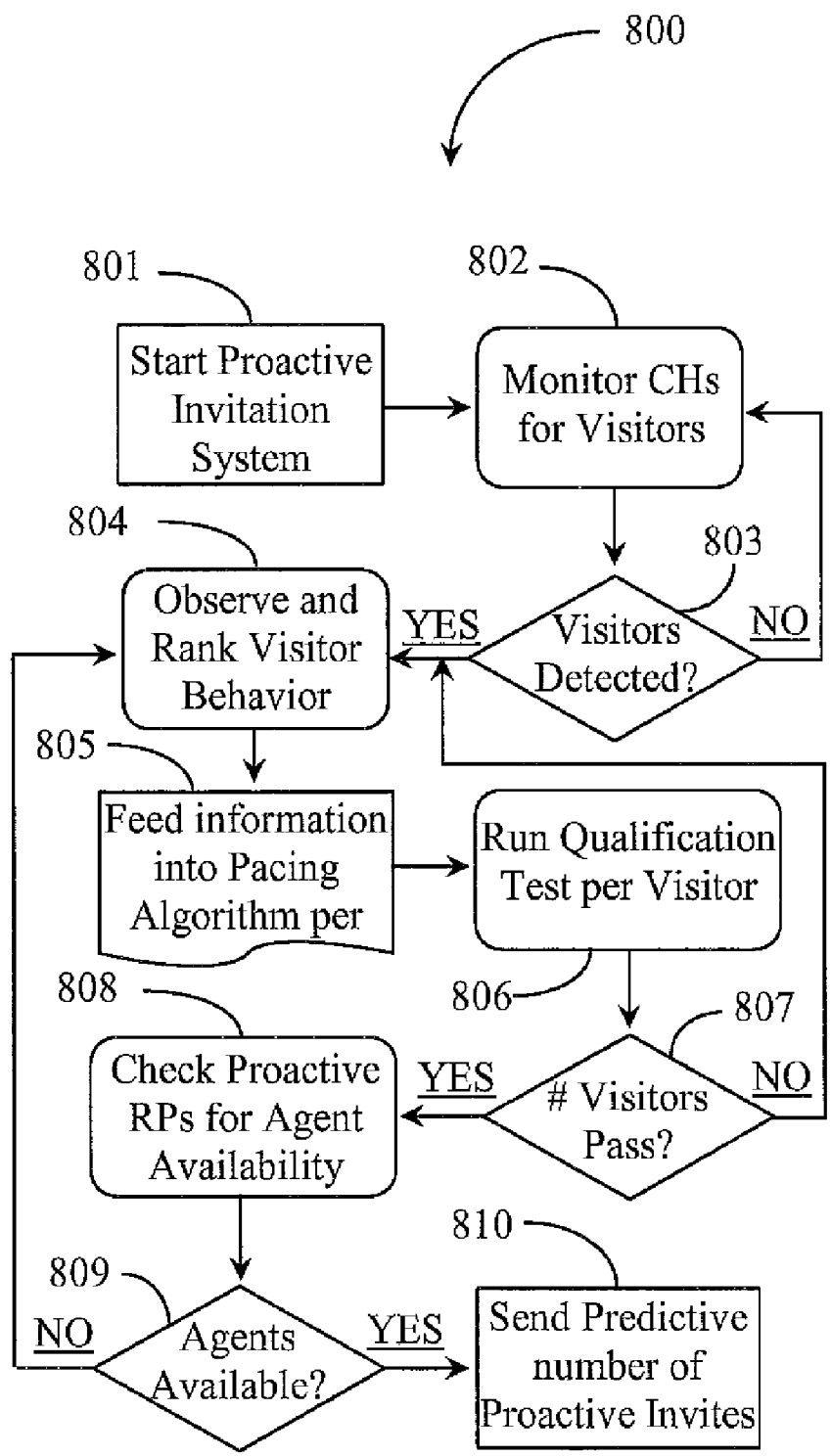
FIG. 8 is a process flow chart illustrating steps for pacing proactive invitations according to an embodiment of the present invention.

FIG. 8 is a process flow chart illustrating steps 800 for pacing proactive invitations according to an embodiment of the present invention. At step 801 the CC starts the proactive invitation system. The proactive invitation system monitors customer access channels at step 802 looking for visitors that may qualify for a proactive invitation. In one embodiment visitors are ranked after a period of observation and auxiliary data lookup. Auxiliary data lookup would be performed if the particular visitor being ranked is known to the system such as a previous customer. The ranking criteria will vary per customer access channel, for example Web visitors may be ranked according to navigation behavior and click history. IVR callers may be ranked according to response, mood, and system navigation or selection of certain options.

At step 803, the system determines if visitors are detected visiting one or more access channels. Access channels can include Web site, chat room or session, IVR, and in some cases live agent conversations. Any channel that provides real-time access to the visitor may be considered for proactive engagement. The key to proactively engaging visitors is the opportunity to convert the visitor into a potential customer engaged in a live interaction with an agent.

At step 803, if the system determines that there are no visitors the process resolves back to step 802 and monitoring continues. If the system finds visitors in one or more customer access channels being monitored at step 803, then the ranking system or service observes and ranks those visitors for proactive engagement in step 804. In one embodiment all visitors may be considered fair candidates for proactive engagement. However, in a preferred application visitors are ranked to improve the likelihood that an agent handling the solicited interaction will be able to positively resolve the interaction (typically a sale). Fewer interactions are generated through ranking than otherwise might be the case but the ones generated have a much higher probability of sale than if just any visitor were solicited.

The criterion used to rank visitors may depend on the customer access channel the visitors are detected on as described above. For each customer access channel, there may be a value established that is equated to a high probability of a sale. The ranking system determines if the observed behavior of the customer is such that the probability value could be realized. A pint system could be implemented that produces a value that can be compared against a system value to determine if a visitor will be solicited for proactive engagement.

If a visitor ranks according to system expectations, the information about the visitor and the parameters of the access channel and session number if any is fed into a pacing algorithm per visitor at step 805. The pacing algorithm may be enhanced with the capability of assigning a segment to the visitor so that only invitations relative to the assigned segment are pushed to the visitor. In one embodiment of the invention the visitor is not ranked in step 804 but is observed and data is collected about the visitor and the interaction activity of the visitor with respect to the access channel.

In this embodiment the pacing system may actually segment and rank the visitor based on statistics compiled about the visitor and the visitor's activity in step 806. Visitor ranking may be conducted serially from visitor to visitor or as a batch of visitors. In this embodiment at step 807 the system may determine if a number of current visitors to one or more access channels should be proactively solicited. If the system determines that none or a sufficient number of detected visitors do not rank highly enough to receive a proactive invitation, the process may resolve back to step 804 for continued observation.

If at step 807, a number of visitors are qualified for proactive engagement, the routing system checks resource pools for agent availability, to handle the newly generated interactions at step 808. In one embodiment segmentation is left to the routing application. In another embodiment customer segmentation can be dynamically assigned by the pacing system instead of by a router. In this example the pacing system is predictive in that it can predict a probable hit rate hit rate (rate at which invitations sent are accepted by visitors). In one embodiment the hit rate is the probability an agent in session with a proactively solicited interaction will make a sale.

At step 808 the system checks the resource pools that are allowed to receive proactively solicited interactions. The pacing algorithm considers agent availability as a function of the intensity of unsolicited interaction flow. If no agents are available and none are predicted to be available, no proactive invitations are sent to the qualified visitors. Therefore the exact number of invitations sent depends in part on the number of available agents. This consideration may be made across the board or by segment.

At step 808, if no agents will be available then the process may resolve back to step 804 for further monitoring. It is important to note that observation is conducted to learn about visitor behavior but is constrained to a certain amount of time per visitor per channel. For example, too little monitoring may not be sufficient to qualify a visitor but too much monitoring risks losing the visitor before a proactive invitation can be sent to the visitor. Each different channel may have different criteria for the time that a visitor is monitored.

If agents are available and ready to accept proactive invitations, then at step 810 a number of invitations are sent out to current visitors that qualify. The pacing system may determine which invitation content types to be sent to which visitor. In one embodiment proactive invitations may be pushed to a visitor or otherwise caused to be presented to a visitor as soon as that visitor is ranked and segmented. In another embodiment segmentation is a routing function that occurs only after the visitor accepts the invitation but before routing to an agent. In one embodiment steps 803-810 are practiced simultaneously for each visitor detected. In this embodiment proactive invitations are metered out according to the frequency of ranking and every ranked visitor that qualifies receives an invitation.

In another embodiment no ranking occurs and every visitor detected receives a proactive invitation so long as there are enough agents to service the interactions that result. It is noted herein that there is a probability that a visitor will ignore or otherwise not accept a proactive invitation. Therefore, step 810 is predictive relative to the number of available agents. For example, if 10 agents are currently available to answer proactive interactions and 15 visitors were ranked to receive such invitations, then all 15 visitors will receive invitations acknowledging that a certain percentage will not accept the invitation. The percentage may be deemed a hit rate. Without ranking the hit rate would be much smaller per number of visitors. The ranking system dramatically improves the percentage of visitors that will accept the invitations sent to them.

In some embodiments invitations are varied in content according to a number of products and services offered by the enterprise. Content of the invitation is matched to the visitor to achieve the best fit for that visitor. For example, if a customer were connected to an IVR self-service line to register a newly purchased computer, monitoring would detect that and a proactive invitation to buy the same model of computer would not be selected for that visitor. However, if monitoring and auxiliary data check reveals that the visitor never received a service package for the purchased computer, then a proactive invitation to buy a service package might be iterated to the IVR caller.

In one embodiment proactive invitations are more abstract seeking primarily to engage the visitor or customer into a live interaction where the IVR or live agent may then make a determination as to what product or service should be offered. In still another embodiment, a proactive invitation is abstract until the visitor or customer accepts the invitation and at live engagement a variety of products may be offered. However, more profit may be generated for a segment with a higher close rate indicating that the visitor or customer should be studied enough to determine the best fit product or service to offer thereby improving the close rate for a resource pool and profitability for the corresponding segment.

Figure 9:
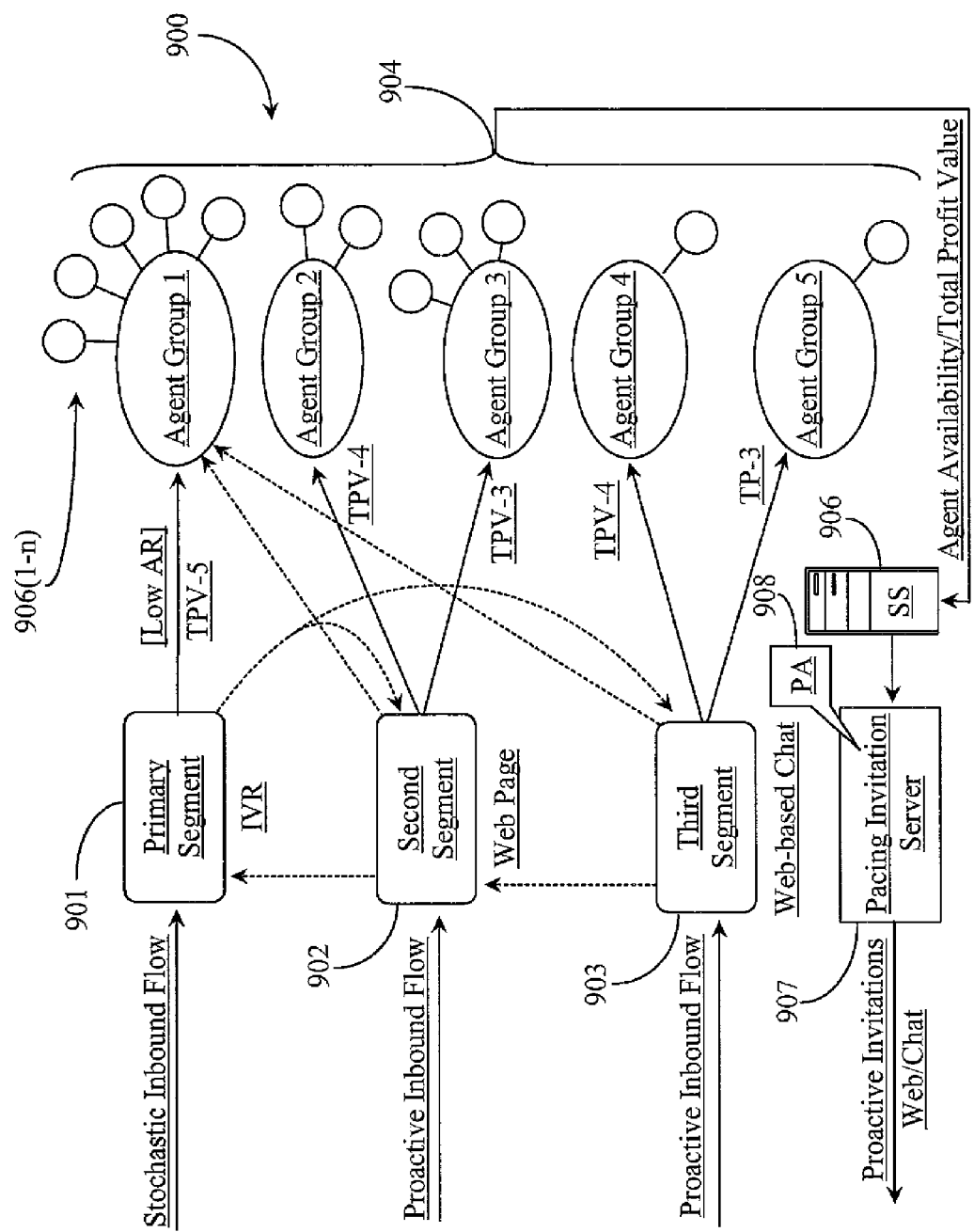
FIG. 9 is a block diagram illustrating agent balancing according to total profit per interaction per segment according to an embodiment of the present invention.

FIG. 9 is a block diagram illustrating agent balancing according to total profit per interaction per segment according to an embodiment of the present invention. Interaction system 900 includes a primary segment 901 that is defined in part as a segment that accepts unsolicited inbound interactions. An inbound flow or stream of these interactions is stochastic in nature. Segment 901 has a primary resource pool of resource pools 904 that is labeled agent group 1. System 900 includes a second segment 902 adapted to primarily be a target for proactively solicited inbound interactions. Segment 902 has a primary resource pool of pools 904 labeled agent group 2 and a secondary resource pool of pools 904 labeled agent group 3. System 900 has a third segment 903 adapted primarily to be a target for proactively solicited interactions. Third segment 903 has a primary resource pool of pools 904 labeled agent group 4 and a secondary pool labeled agent group 5.

Segment 901 is a primary routing target for all IVR callers. Most of these calls will be unsolicited interactions. A smaller per percentage of these calls may be proactively solicited inbound interactions. Segment 902 is a primary routing target for Web visitors. Unsolicited Web interactions requesting live agent assistance may be routed to IVR or to chat with an agent. However, segment 902 utilizes its agents in agent groups 2 and 3 primarily to handle proactively solicited interactions and therefore may be considered a proactive segment. Third segment 903 is also a primary routing target for proactively solicited interactions and therefore may be considered a proactive segment. Segment 903 utilizes the agents in groups 4 and 5 to handle Web-based chat visitors that accept proactive invitations.

Under ideal conditions there are enough direct unsolicited interactions for segment 901 to keep all of the agents 905 of agent group 1 90 to 100 percent utilized while maintaining the SLO for the CC. Under these ideal conditions segment 902 has enough prospects to fully utilize agents in groups 2 and 3. Under these ideal conditions, segment 903 has enough chat prospects to keep the agents in groups 4 and 5 fully utilized. It is noted herein that each segment and associated resource pool is backed up by another segment and associated resource pool. In this example Segment 901 and agent group 1 run backup for segment 903 and agent groups 4 and 5. Segment 902 and agent groups 2 and 3 run backup for segment 1 and agent group 1. Segment 903 and agent groups 4 and 5 run backup for segment 902 and agent groups 2 and 3. Segment 901 may also take interactions from segment 902 if dynamically assigned to do so. It is noted herein that assigning resource pools as backup pools is a dynamic process and standing assignments can be change or modified during routing of interactions.

In this example available agents 905 (1-$n$) illustrate all of the available agents for all of the agent groups working the campaign. In this example Agent groups 4 and 5 are fully utilized. Agent groups 2 and 3 have more available agents, and the agents in group 1 are underutilized. This can occur when the proactive prospects are high for segments 902 and 903 while unsolicited inbound interaction flow is low as measured by the current arrival rate of interactions routed to segment 901.

All of the agent groups working the campaign have skill and proficiency levels that are ranked according to average profit per interaction per segment. For example, total profit value (TPV) of segment 1; agent group 1 is 5 on a scale from 1 to 5. Primary agent group 2 for segment 902 has a TPV of 4 while the secondary group for the same segment has a primary TPV of 3. Agent group 4 and agent group 5 are similarly valued for segment 903. In this example, it may be assumed that all of the segments are involved in marketing the same products or services, meaning that segmentation is not according to different types of products or services. Rather segmentation is along the lines of customer access channel and type of interaction being unsolicited inbound or proactively solicited inbound.

A statistics server (SS) 906 is illustrated in this logical example and has connection to all of the agent groups as well as to the interaction queue or queues (not illustrated). SS 906 has all of the current statistics on agent availability and total profit value for each agent group associated with a segment. A pacing invitation server 907 is illustrated in this example and controls, with the aid of a pacing algorithm 908, the pacing or throttling of invitations sent out to prospects of segment 902 and of segment 903 primarily.

In this example segment 901 is a primary segment. Segment 901 has the resource pool (Agent Group-1) that generates the highest level of profit per interaction for the CC. Therefore, when the stochastic nature of unsolicited inbound interactions changes and there is a trough in the arrival rate, agent group 1 will have a number of idle agents 905 (1-$n$). In this simple representation there are 5 idle agents in agent group-1, which is just one agent shy of all of the available agents in the other 4 agent groups.

The routing strategy used is target extension so when it is statistically known that the resource pool for 901 is underutilized while the other resource pools handling primarily proactively solicited interactions are not or less so, segment 901 becomes a natural routing target for some of the proactive interactions normally routed to the other segments. Following the logic of total profit value, the routing system begins routing some proactively solicited interactions from segments 902 and 903 to segment 901 and agent group 1 to engage the 5 idle agents. If the proactive pacing frequency stays the same, there will be more idle agents appearing in agent groups 2-3. Therefore, with the aid of pacing algorithm 908, the system estimates the number of agents required to handle all of the proactively solicited inbound interactions minus the available agents and adjusts the pacing frequency to increase the number of proactively solicited inbound interactions so that agent groups 2-5 will be well utilized while interactions are being redirected from the respective segments to segment 901 and agent group 1.

It is noted that there are some predictive components to the adjustment of proactive invitation pacing, for example, the hit rate or probability that a visitor will accept an invitation to engage a live agent. Another probability value is likelihood that an agent will be able to successfully resolve an accepted interaction (likely a sale). This probability value may be linked to ranking, which is used in one embodiment to qualify visitors for proactive invitation. Since profit is a big motive of routing in this case, it is most important to keep the agents of group 1 utilized making segment 901 the primary or most important segment of the campaign.

In this particular scenario, more proactive interactions are desired to help utilize predicted idle agents for agent groups 2-5 that are predicted to be idle as a result of redirection of proactive traffic to the more profitable agent group 1. Therefore the pacing algorithm increases the frequency of invitation. In some cases, there may not be enough ranked prospects to receive the invitations so the ranking system may reduce the ranking requirements or suspend them if needed to generate more proactive leads. For example, the probability value that an agent will be able to close a deal may be lowered temporarily resulting in more ranked visitors. When it is statistically known that all of the agents in all of the groups are best utilized, the system will stabilize and wait for a next stochastic fluctuation to occur. If the next change results in a rise in unsolicited interaction flow, the pacing algorithm may estimate the number of agents required to handle the difference and reduce proactive invitation frequency accordingly.

One with skill in the art will appreciate that the campaign may also be supplemented with outbound calling without departing from the spirit and scope of the present invention. During trough periods where both unsolicited inbound flow and proactively solicited interaction flow are down, resources like agent groups 4 and 5 for segment 903 may be assigned outbound or offline tasks. In another embodiment of the invention proactively solicited interaction flow may take some priority over unsolicited inbound interaction flow based on the quality of visitor ranking and if the probability of the agent successfully closing a transaction for a proactively solicited interaction is better on average than the probability applied to unsolicited interactions.

Figure 10:
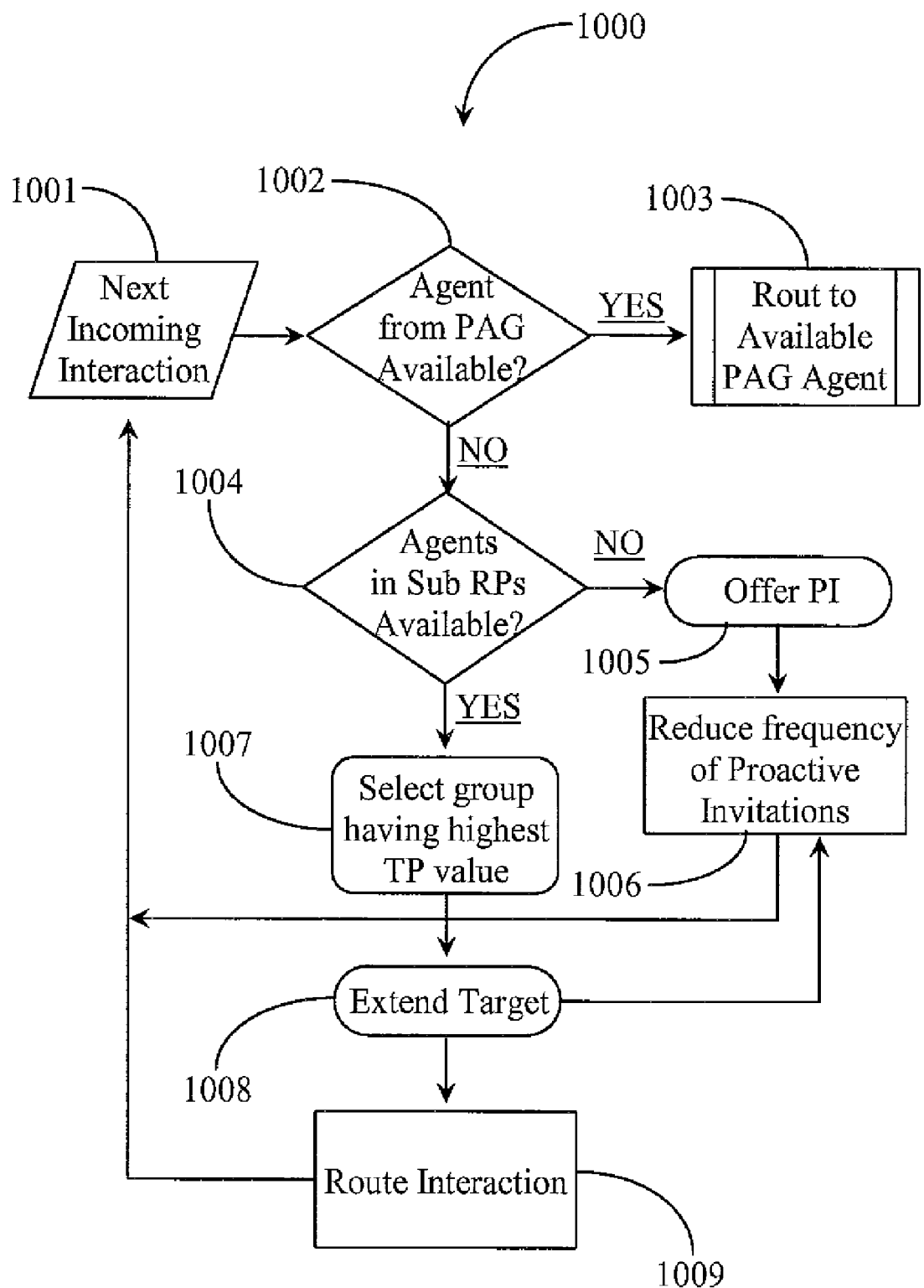
FIG. 10 is a process flow chart illustrating steps for extending a routing target according to an embodiment of the present invention.

FIG. 10 is a process flow chart illustrating steps for extending a routing target according to an embodiment of the present invention. At step 1001 the routing system accepts a next interaction. At step 1002 the system makes a determination of agent availability for the primary agent group working a segment. If at step 1002 the system determines that there is an available agent in the primary agent group working the segment, at step 1003 the system routes the interaction to the agent. If at step 1002, the routing system determines that no agents are available in the primary agent group working the segment the system determines agent availability at one or more sub resource pools.

If there are no agents available at step 1004 then a proactive invitation is offered at step 1005 to receive a call-back at a later time. This invitation is not considered a part of the normal proactive solicitation as these are directed to live assistance and based on agent availability to handle the proactive inbound flow. At step 1006 the pacing system reduces the frequency of proactive invitations to visitors of the CC. In this case the process loops back to step 1001 and the system takes the next interaction pending. By reducing the number of proactive invitations at step 1006, more agents should become available to handle interactions.

At step 1004 if there are available agents in one or more of the sub resource pools then the routing system selects the agent group having the highest total profit (TP) value. At step 1008 the routing system may extend the routing target by adding the agent group selected at step 1007 to the list of routing targets for the interaction. At step 1009 the routing system routes the interaction and the process resolves back to step 1001 for the next interaction. At step 1008 the system may also call the pacing system while extending the target to determine if the number of proactive invitations needs to be reduced based on the total number of available agents found in step 1004. It is important that the primary agent group stay busy but overflow from unsolicited interaction flow must be handled efficiently maintaining SLOs for the CC.

It will be apparent to one with skill in the art that the interaction management system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A communications center system, comprising:
   unsolicited inbound transaction traffic for routing to agents;
   one or more channels engaging visitors to the communication center other than interaction with a live agent;
   a profiling function for gathering information about the visitors to the communications-center, during the time the visitors are engaged in other than interaction with a live agent;
   a ranking function for ranking the visitors as to desirability for interaction, according to the information gathered; and
   an invitation function for sending invitations to transact to the visitors according to the ranking;
   wherein the system monitors agent availability and the unsolicited inbound transaction traffic, and manages the invitation function to balance total traffic with agent availability.

2. The system of claim 1 wherein the information gathered by the profiling function includes determining visitor intent by monitoring behavior and transaction content.

3. The system of claim 1 wherein live agents are managed in specialty agent groups, unsolicited inbound traffic is routed to agent groups according to information known about the customer or the transaction, and invitations to transact are sent to visitors according to manage traffic flow to individual groups as well as total traffic.

4. The system of claim 1 wherein the visitors to the communication center other than interaction with a live agent are engaged in one of a web site interaction, an IVR transaction, or a chat transaction.

5. A method for balancing transaction flow in a communications center, comprising steps of:
   (a) monitoring unsolicited inbound transaction traffic for routing to agents;
   (b) gathering information about visitors engaged with the center other than in interaction with a live agent, during the time the visitors are engaged;
   (c) ranking the visitors as to desirability for interaction, according to the information gathered;
   (d) sending invitations to transact to the visitors according to the ranking; and
   (e) monitoring agent availability and managing the invitation function to balance total traffic with agent availability.

6. The method of claim 5 including determining visitor intent by monitoring behavior and transaction content.

7. The method of claim 5 including managing live agents in specialty agent groups, routing unsolicited inbound traffic to agent groups according to information known about the customer or the transaction, and sending invitations to transact to visitors to manage traffic flow to individual groups as well as total traffic.

8. The method of claim 5 wherein the visitors to the communication center other than interaction with a live agent are engaged in one of a web site interaction, an IVR transaction, or a chat transaction.

* * * * *